United States Patent Office 3,403,113
Patented Sept. 24, 1968

3,403,113
CURABLE NITROGEN-CONTAINING
CONDENSATION PRODUCTS
Hermann Diethelm, Aesch, Basel-Land, and Willy Fisch and Ewald Forster, Binningen, Switzerland, assignors to Ciba Limited, Basel, Switzerland, a Swiss company
No Drawing. Filed Mar. 18, 1966, Ser. No. 535,361
Claims priority, application Switzerland, Mar. 26, 1965, 4,208/65
9 Claims. (Cl. 260—2)

The present invention provides new, curable condensation resins containing nitrogen which are obtained when in a first stage dicyandiamide or cyanamide is condensed, preferably at an elevated temperature, with a polyamine containing at least three primary and/or secondary amino groups, especially with a polyalkylene-polyamine that contains in addition to at least two primary amino groups at least one secondary amino group, using preferably for every equivalent of primary amino groups of the polyamine 0.1 to 1.0 mol of dicyandiamide or 0.2 to 2.0 mols of cyanamide, whereupon in a second stage the polycondensate obtained in this manner is reacted, likewise preferably at an elevated temperature, with an epihalohydrin, preferably with epichlorohydrin, using advantageously 0.3 to 3.0 mols, preferably 1 to 1.5 mols, of epihalohydrin for every equivalent of secondary amino groups of the polyamine used in the first stage of the process.

The new products obtained according to the present process are water-soluble, thermocurable resins which are excellently suited for improving cellulosic materials, especially for the manufacture of paper of good wet strength.

As starting material for the manufacture of the nitrogen-containing polycondensates obtained in the first stage of the present process there is used dicyandiamide or cyanamide and polyamine containing at least 3 amino groups. Preferred polyamines of this kind are diethylenetriamine and analogous polyalkylene-polyamines, especially polyethylene-polyamines, polypropylene-polyamines and polybutylene-polyamines. Specifically, there may also be mentioned:

Triethylenetetramine, tetraethylenepentamine, pentaethylenehexamine, dipropylenetriamine, N-bis(aminopropyl)methylamine and their mixtures, and the polyamine mixtures resulting from the industrial manufacture of such polyamines. There may also be used other polyamines, for example lower polymers of ethylenimine.

In the manufacture of the polycondensates of the first stage of the present process of dicyandiamide or cyanamide is heated with the polyamine advantageously at a temperature from about 100 to 200° C., preferably from 130 to 160° C., and in the course of this exothermic reaction for every mol of dicyandiamide 2 mols of ammonia, or from every mol of cyanamide 1 mol of ammonia are/is eliminated.

As a rule it is not necessary to perform this condensation in the presence of a solvent because the reactants dissolve one in the other at the high reaction temperature employed; however, if required, an inert solvent, such as ethyleneglycol monoalkyl ether or dialkyl ether, or diethyleneglycol monoalkyl or dialkyl ether may be used additionally.

The proportions of the polyamine and dicyandiamide to be used are advantageously adapted to the number of primary amino groups present in the polyamine in a manner such that for every equivalent of primary amino groups 0.1 to 1.0 mol of dicyandiamide or 0.2 to 2.0 mols of cyanamide is/are used, that is to say, for example, for every mol of a diprimary amine, such as diethylenetriamine, about 0.2 to 2.0 mols of dicyandiamide.

To prevent a possible excessive discoloration of the polycondensates, it is advantageous to perform the polycondensation in an inert gas, such as nitrogen, or with at least partial exclusion of oxygen.

If desired, the molecular weights of the polycondensates can be kept to a certain value by adding a mono-functional amine and for this purpose the use of high-boiling amines, for example aniline or ethanolamine, is required.

Alternatively, the polycondensation reaction—which is generally continued until ammonia is no longer being liberated may be discontinued before reaching finality to restrict the molecular weight of the polycondensate.

The polycondensate obtained in the first stage is then reacted according to this invention in a second stage with an epihalohydrin.

Processing of the afore-mentioned polycondensates before use is avoided by diluting the still hot, crude polycondensate with water and then reacting it with the epihalohydrin.

A suitable epihalohydrin is, for example, epibromohydrin or preferably epichlorohydrin. If desired, the epihalohydrin may be prepared in situ by starting from a glycerol dihalohydrin.

The reaction of the polycondensate from dicyandiamide and polyamine with the epihalohydrin is preferably performed in an aqueous solution or dispersion, or in another medium, for example in acetone or an alcohol such as methanol or ethanol, or in mixtures thereof with water. The reaction of the second stage is generally carried out at an elevated temperature, preferably at 60 to 100° C. As soon as the reaction mixtures show signs of an impending gelation, the reaction is advantageously interrupted by adding an acid and/or dilution with water.

As a rule 0.3 to 3 mols, preferably 1 to 1.5 mols, of epihalohydrin are used for every equivalent of secondary amino groups in the polyamine used in the first stage for the polycondensation with dicyandiamide or cyanamide. As more active hydrogen atoms bound to nitrogen are being replaced by epihalohydrin, the shelf life of the final product increases and the reactivity of the final product drops accordingly. Another means of increasing the shelf life of the resin obtained after condensation with the epihalohydrin is the subsequent quaternation of the amino groups.

The quaternation of the tertiary amino groups formed by reaction with the epihalohydrin, which may be performed at the end, is carried out with the usual relevant reagents, for example an alkylhalide such as methylchloride, ethylchloride, methylbromide or ethylbromide; an alkylsulphate such as dimethylsulphate or diethylsulphate; an alkyl- or arylphosphate, aralkylhalide such as benzylchloride; an alkylsulphonate such as methyl-para-toluenesulphonate. A quaternation effect is also achieved by adding the appropriate glycerol dihalohydrin, or 1-chloroglycerol, after the reaction with the epihalohydrin.

To ensure that the quaternation results in a distinct stabilizing effect, a sufficiently large share, that is to say at least 10 mol percent, of the tertiary amino groups must be quaternated, but it is not necessary to quaternate all tertiary amino groups.

The quaternating agent may be added immediately after cessation of the reaction with the epihalohydrin.

According to a preferred variant of the present process it is also possible to modify the new nitrogen-containing condensation resins by replacing part of the dicyandiamide or cyanamide by other bifunctional compounds capable of undergoing condensation with the polyamine. As such compounds, capable of partially replacing dicyandiamide, there may be mentioned, for example:

Diamines, such as hexamethylenediamine; urea, formaldehyde, glyoxal, higher aldehydes such as acetaldehyde, crotonaldehyde or dicarboxylic acids, especially adipic or oxalic acid and their esters. These bifunctional compounds may be added at any desired point of time during the first stage of the present process or during the condensation of the dicyandiamide with the polyamine.

Some of the modifying agents, however, may be added also during or after the reaction with the epihalohydrin. In the latter case the selected bifunctional compound is at first not built into the molecule of the condensation resin but forms with it a physical mixture. When such mixtures are used, for example for improving papers—in the course of which operation the resin is cured or fixed on the substrate—these bifunctional compounds act as additional cross-linking reagents. As such cross-linking reagents there may be used, above all, the same polyamines as have been used as starting materials for the manufacture of the condensation resins of this invention, such as diethylenetriamine or dipropylenetriamine; furthermore adipic acid and adipic acid monoalkyl or dialkyl esters, such as adipic acid monomethyl or dimethyl ester.

Depending on the type of amine component and the ratio of polyamine:dicyandiamide or cyanamide and epichlorohydrin chosen the condensation resins of this invention are readily soluble or only dispersible in water.

The stability of the aqueous solutions can be substantially increased by adjusting them to an acid pH value. Furthermore, improved stability is also achieved by diluting the aqueous solutions so that, for example with a 10% solution at a pH value from 4.5 to 5 at room temperature a stability of 3 to 4 months is ensured. Resin solutions adjusted to an excessive acidity produce solid deposits after only a few days.

The condensation products of this invention are valuable improving agents for cellulosic materials, such as textiles and papers, especially however for making papers having considerable wet strength. The new resins having such improved wet strength may be used in ordinary water without requiring a special adjustment of the pH value.

Since there is no need of working in the acid region, there is no risk of the cellulose undergoing hydrolysis or the paper making machines being corroded. The paper resin solution may also be added to the paper pulp as it is without any preliminary processing, such precrosslinking ("ripening") as is generally needed with melamine-formaldehyde condensation products. Even minor additions of the resin of this invention will produce good wet-strength values.

Accordingly, the present invention includes also the use of the new condensation resins, obtained by condensing dicyandiamide or cyanamide with a polyamine containing at least three primary and/or secondary amino groups and subsequent reaction with an epihalohydrin, in the form of an aqueous solution or dispersion for improving cellulosic materials, more especially for imparting or improving the wet strength of paper, for improving the retention of dyestuffs and fillers in paper making and for accelerating the dehydration of the pulp.

The new condensation resins are also suitable as auxiliaries in leather tanning.

Percentages in the following examples are percentages by weight.

EXAMPLE 1

First stage.—Condensation of dicyandiamide with diethylenetriamine 252 grams (3 mols) of dicyandiamide are sprinkled into 309 g. (3 mols) of diethylenetriamine contained in a four-necked round-bottom flask equipped with thermometer, agitator and reflux condenser. The mixture is heated within 30 minutes to 130 to 140° C. At 80 to 100° C. the dicyandiamide passes into solution. Between 130 and 140° C. a vivid evolution of ammonia sets in; it takes an exothermic course, with the temperature rising to about 160° C. The amount of ammonia released and escaping during the reaction is measured by back weighing. The amount of ammonia eliminated in this manner is 98 to 100 g., corresponding to about 6 mols of $NH_3$. The reaction mixture is heated for 1 hour at 160° C. to expel the last remnants of ammonia. During the subsequent cooling, 200 ml. of water are slowly added at 120° C. and the mixture is stirred until it has turned homogeneous. Yield: 660 g. of a suspension of about 69 to 70% solids content.

Second stage.—Reacting with the condensation product obtained in the first stage with epichlorohydrin 144 grams of the suspension of 69 to 70% strength of the condensation product are diluted with 256 ml. of water to a solids content of 25% and poured into a four-necked round-bottom flask equipped with agitator, thermometer and reflux condenser. The mixture is heated to 60° C. and 74 g. of epichlorohydrin are dropped in through a dropping funnel so slowly that the temperature does not rise above 50 to 60° C. When all epichlorohydrin has been dropped in, the clear solution is heated to 90° C. and maintained at this temperature until it begins to turn gelatinous. The reaction is terminated by pouring in 1270 ml. of water containing 10 g. of concentrated hydrochloric acid. The cooled solution is adjusted to pH=4.5. The paper resin solution obtained in this manner has a solids content of 10%.

The paper resin solution thus prepared was used for making sized and unsized papers weighing 110 grams per square metre from bleached sulphite pulp (fineness: 30° Schopper-Riegler) and the papers were then hardened. The finished papers revealed the following dry, wet and relative tear strength values:

| | Specimen | | | |
|---|---|---|---|---|
| | 1 | 2 | 3 | 4 |
| Dry resin (percent, referred to pulp) | | 1 | | 1 |
| $Al_2(SO_4)_3$ (percent referred to pulp) | | | 3 | 3 |
| Rosin size (percent, referred to pulp) | | | 2 | 2 |
| Dry tear strength, in km | 3.50 | 3.78 | 3.64 | 4.76 |
| Wet tear strength, in km | 0.15 | 1.24 | 0.31 | 1.66 |
| Relative wet tear strength, in percent | 4.2 | 32.7 | 8.6 | 34.8 |

EXAMPLE 2

A paper resin solution is prepared as described in Example 1, except that a further addition of 5 g. of dipropylenetriamine is made to the finished solution.

In the manner described in Example 1, papers were made and tested with this product:

| | Specimen | | | |
|---|---|---|---|---|
| | 1 | 2 | 3 | 4 |
| Dry resin (percent, referred to pulp) | | 1 | | 1 |
| $Al_2(SO_4)_3$ (percent, referred to pulp) | | | 3 | 3 |
| Rosin size (percent, referred to pulp) | | | 2 | 2 |
| Dry tear strength, in km | 3.50 | 6.13 | 3.64 | 4.74 |
| Wet tear strength, in km | 0.15 | 1.35 | 0.31 | 1.40 |
| Relative wet tear strength, in percent | 4.2 | 21.9 | 8.6 | 29.4 |

EXAMPLE 3

A paper resin solution is prepared as described in Example 1, except that 10 g. of adipic acid are further added to the finished paper resin solution.

This product was used to make and test paper in the manner described in Example 1:

| | Specimen | | | |
|---|---|---|---|---|
| | 1 | 2 | 3 | 4 |
| Dry resin (percent, referred to pulp) | | 1 | | 1 |
| $Al_2(SO_4)_3$ (percent, referred to pulp) | | | 3 | 3 |
| Rosin size (percent, referred to pulp) | | | 2 | 2 |
| Dry tear strength, in km | 3.50 | 5.50 | 3.64 | 5.82 |
| Wet tear strength, in km | 0.15 | 1.63 | 0.31 | 1.33 |
| Relative wet tear strength, in percent | 4.2 | 29.5 | 8.6 | 22.8 |

EXAMPLE 4

A paper resin solution is prepared as in Example 1, except that 5 g. of diethylenetriamine are further added to the finished paper resin solution.

With this product papers were made and tested as described in Example 1:

|  | Specimen | | | |
| --- | --- | --- | --- | --- |
|  | 1 | 2 | 3 | 4 |
| Dry resin (percent, referred to pulp) |  | 1 |  | 1 |
| $Al_2(SO_4)_3$ (percent, referred to pulp) |  |  | 3 | 3 |
| Rosin size (percent, referred to pulp) |  |  | 2 | 2 |
| Dry tear strength, in km | 3.50 | 4.95 | 3.64 | 4.98 |
| Wet tear strength, in km | 0.15 | 2.02 | 0.31 | 1.79 |
| Relative wet tear strength, in percent | 4.2 | 40.7 | 8.6 | 36.0 |

EXAMPLE 5

144 grams of the 60 to 70% suspension obtained in stage 1 of Example 1 are diluted with 256 ml. of water to a solids content of 25% and poured into a four-necked round-bottom flask equipped with agitator, thermometer and reflux condenser. The mixture is heated to 60° C. and 49 g. of epichlorohydrin are dropped in through a dropping funnel so slowly that the temperature can be kept constant at 50 to 60° C. When all epichlorohydrin has been dropped in, the solution is heated to 90° C. and maintained at this temperature until gelation sets in. The reaction is termminated by pouring in 1190 ml. of water containing 10 g. of concentrated hydrochloric acid. The cooled solution is adjusted to pH=4.5. The paper resin solution obtained in this manner is suitable for making papers having good wet strength properties.

EXAMPLE 6

Dicyanidiamide is condensed with diethylenetriamine as in the first stage of Example 1, except that 168 g. (2 mols) of dicyanidiamide and 309 g. (3 mols) of diethylenetriamine are used. At the end of the condensation 200 ml. of water are added and there are obtained 610 g. of a solution containing 67% of solids.

150 grams of the 67% solution are diluted with 250 ml. of water to a solids content of 25%, whereupon the reaction with epichlorohydrin described in Example 1, stage 2, is performed in identical manner. The reaction is brought to an end by pouring in 1520 ml. of water containing 10 g. of concentrated hydrochloric acid. The resulting paper resin solution is suitable for making papers having good wet fastness properties.

EXAMPLE 7

168 grams (2 mols) of dicyanidiamide are sprinkled into 309 g. (3 mols) of dietheylenetriamine contained in a four-necked round-bottom flask equipped with thermometer, agitator and reflux condenser. The mixture is heated to 130 to 140° C. On cessation of the exothermic ammonia evolution the reflux condenser is removed and replaced by a Claisen distillation head with receptacle. The reaction mixture is maintained at 150° C. and 174 g. (1 mol) of adipic acid dimethyl ester are dropped in through a dropping funnel. The progress of the condensation is checked by measuring the eliminated methanol. To expel the last remnants of methanol, the reaction is finally carried out under vacuum. The condensation product is then diluted with 200 ml. of water, to yield 720 g. of a solution of 67% solids content.

139 grams of the 67% solution are diluted with 261 ml. of water and then reacted with 65 g. of epichlorohydrin as described in Example 1, stage 2. The reaction is brought to an end by pouring in 1300 ml. of water containing 10 g. of concentrated hydrochloric acid.

With this product papers are made and tested as described in Example 1:

|  | Specimen | |
| --- | --- | --- |
|  | 1 | 2 |
| Dry resin (percent, referred to pulp) |  | 1 |
| Dry tear strength, in km | 3.65 | 5.65 |
| Wet tear strength, in km | 0.14 | 1.39 |
| Relative wet tear strength, in percent | 3.7 | 24.6 |

EXAMPLE 8

144 grams of the suspension of 69 to 70% solids content, obtained in the first stage of Example 1, are diluted with 256 ml. of water to a solids content of 25% and then poured into a round-bottom flask equipped with agitator, thermometer and reflux condenser. The mixture is heated to 60° C., and 74 g. of epichlorohydrin are dropped in through a dropping funnel so slowly that the temperature can be maintained at 50 to 60° C. When all epichlorohydrin has been dropped in, 20 g. of benzylchloride are dropped in. The solution is then heated to 90° C. and maintained at this temperature until gelation sets in. The reaction is brought to an end by pouring in 1270 ml. of water containing 10 g. of concentrated hydrochloric acid. The cooled solution is adjusted to pH=4.5.

This product is used to make and test papers as described in Example 1:

|  | Specimen | |
| --- | --- | --- |
|  | 1 | 2 |
| Dry resin (percent, referred to pulp) |  | 1 |
| Dry tear strength, in km | 4.84 | 5.86 |
| Wet tear strength, in km | 0.13 | 1.21 |
| Relative wet tear strength, in percent | 2.67 | 20.71 |

EXAMPLE 9

First stage 42 grams (1 mol) of cyanamide are sprinkled into 51.5 g. (0.5 mol) of diethylenetriamine contained in a four-necked round-bottom flask equipped with thermometer, agitator and reflux condenser. The mixture is heated within 30 minutes to 130 to 140° C. At 80 to 100° C. the cyanamide dissolves. Between 130 and 140° C. a vivid exothermic evolution of ammonia sets in, with the temperature rising to about 160° C. The ammonia liberated and escaping during the reaction is measured by back weighing. The amount of ammonia determined in this manner corresponds to 1 mol. The reaction mixture is heated for 1 hour at 160° C. to expel the last remnants of ammonia. During the subsequent cooling, 60 ml. of water are slowly added at 120° C. and the batch is further stirred until it has become homogeneous. Yield: 135 g. of a suspension of 55.5% solids content.

Second stage 135 grams of the 55.5% suspension are diluted with 165 ml. of water to a solids content of 25% and poured into a four-necked round-bottom flask equipped with agitator, thermometer and reflux condenser. The mixture is heated to 60° C. and 55.5 g. of epichlorohydrin are dropped in through a dropping funnel so slowly that the temperature does not rise above 50 to 60° C. When all epichlorohydrin has been dropped in, the clear solution is heated to 90° C. and maintained at this temperature until gelation sets in. The reaction is brought to an end by pouring in 950 ml. of water. The cooled solution is adjusted with hydrochloric acid to pH=4.5. The paper resin solution obtained in this manner is suitable for making papers having good wet strength properties.

EXAMPLE 10

First stage.—Condensing dicyandiamide with triethylenetetramine 252 grams (3 mols) of dicyandiamide are sprinkled into 396 g. (3 mols) of triethylenetetramine contained in a four-necked round-bottom flask equipped with thermometer, agitator and reflux condenser. The mixture is heated within 30 minutes to 140 to 150° C. At 100 to 120° C. the dicyandiamide dissolves. Between 140 and 150° C. a vivid evolution of ammonia sets in; it takes an exothermic course and the temperature rises to about 160° C. The ammonia liberated and escaping during the reaction is measured by back weighing. The reaction mixture is heated for 1 to 2 hours at 160° C. to expel the last remnants of ammonia. During the subsequent cooling, 648 ml. of water are slowly added at 120° C. and the batch is further stirred until it has become homogeneous, to yield 1209 g. of a suspension having a solids content of 46.4%.

Second stage.—Reacting the condensation product obtained in the first stage with epichlorohydrin 196 grams of the 46.4% suspension are diluted with 168 g. of water to a solids content of 25% and poured into a four-necked flask equipped with agitator, thermometer and reflux condenser. The mixture is heated to 60° C., and 61.5 g. of epichlorohydrin are dropped in through a dropping funnel so slowly that the temperature does not rise above 50 to 60° C. When all epichlorohydrin has been dropped in, the clear solution is heated to 90° C. and maintained at this temperature until gelation sets in. The reaction is terminated by pouring in 1100 g. of water containing 10 g. of concentrated hydrochloric acid. The cooled solution is adjusted to pH=4.5.

The resulting paper resin solution can be used for making papers having good wet strength properties (similar to those shown in Example 1).

a maximum output of the filter cake—the following factors are important, apart from the wet fastness finish:

(1) Rapid flocculation of the pulp and the additives (pigments, fillers, etc.) at different pH values.
(2) Purity of the resulting waste waters.
(3) Rapid dehydration of the wet paper cake.

British Specification No. 988,622 (published on Apr. 7, 1965) disclosed a simple method which is very well suited to testing the properties mentioned above. Suspensions of bolus alba in water are prepared, mixed with very small amounts of paper resin and in each case the filtering time taken is measured. The known paper resins A and C were compared with the paper resin B of this invention by this method.

The tests were carried out as follows: 10 g. of bolus alba was sprinkled into 90 g. of water, the paper resin added and the pH value adjusted with sodium hydroxide solution. The finished suspension was filtered under a weak vacuum and the percolation time measured.

The filtering times of the paper resins A, B and C were measured in three different concentrations $c$ (in percent of of dry resin, referred to bolus alba) at pH=4, 7 and 10, respectively. For results see the following Tables I and II:

TABLE I.—FILTERING TIME ($t_F$) IN SECONDS

| c in percent o | Paper resin A | | | Paper resin B | | | Paper resin C | | | $\Sigma t_F$ |
|---|---|---|---|---|---|---|---|---|---|---|
| | pH 4 | pH 7 | pH 10 | pH 4 | pH 7 | pH 10 | pH 4 | pH 7 | pH 10 | |
| 0.0 | 271 | 386 | 1,672 | 271 | 386 | 1,672 | 271 | 386 | 1,672 | |
| 0.2 | 229 | 298 | 1,085 | 183 | 266 | 1,026 | 202 | 277 | 1,120 | 4,686 |
| 0.4 | 211 | 279 | 1,105 | 160 | 175 | 685 | 173 | 259 | 1,142 | 4,189 |
| 0.6 | 203 | 265 | 896 | 128 | 188 | 467 | 172 | 266 | 990 | 3,575 |
| $\Sigma t_F$ | 643 | 842 | 3,086 | 471 | 629 | 2,178 | 547 | 802 | 3,252 | |
| $\Sigma t_F$ | | 4,571 | | | 3,278 | | | 4,601 | | 12,450 |

TABLE II.—RATIO FILTERING TIME WITHOUT PAPER RESIN: FILTERING TIME WITH PAPER RESIN

| c in percent o | Paper resin A | | | Paper resin B | | | Paper resin C | | | III |
|---|---|---|---|---|---|---|---|---|---|---|
| | pH 4 | pH 7 | pH 10 | pH 4 | pH 7 | pH 10 | pH 4 | pH 7 | pH 10 | |
| 0.0 | 1.00 | 1.00 | 1.00 | 1.00 | 1.00 | 1.00 | 1.00 | 1.00 | 1.00 | 9.00 |
| 0.2 | 1.18 | 1.30 | 1.54 | 1.48 | 1.45 | 1.63 | 1.34 | 1.39 | 1.49 | 12.80 |
| 0.4 | 1.28 | 1.38 | 1.51 | 1.69 | 2.21 | 2.44 | 1.57 | 1.49 | 1.46 | 15.03 |
| 0.6 | 1.33 | 1.45 | 1.87 | 2.12 | 2.05 | 3.58 | 1.58 | 1.45 | 1.69 | 17.12 |
| I | 3.79 | 4.13 | 4.92 | 5.29 | 5.71 | 7.65 | 4.49 | 4.33 | 4.64 | 44.95 |
| II | | 12.84 | | | 18.65 | | | 13.46 | | |

EXAMPLE 11

In this example the filtering speeds of a paper resin of this invention are compared with those of two known types of paper resins.

The paper resin of the invention (=paper resin B) is a 10% aqueous solution, prepared as described in Example 1, of the reaction product of dicyandiamide with diethylenetriamine and epichlorohydrin.

The known paper resin containing formaldehyde (=paper resin A) is a 10% aqueous cation-active solution of melamine-formaldehyde resin solution (ratio melamine:formaldehyde=1:3.9) prepared as described in Example 2 of Swiss Patent 253,015 (corresponding to French Patent 917,895, to British Patent 623,355 and to U.S. Patent 2,345,543) is mixed with a very small amount of paper resin and in each test the filtering time taken is measured.

The used known formaldehyde-free paper resin (=paper resin C) is the 10% aqueous solution (marketed by Hercules Powder Co., under the registered trade mark "Kymene 557") of a condensation product of diethylenetriamine with adipic acid and epichlorohydrin, whose manufacture was disclosed in Example 1 of the published German Specification (DAS) 1,177,824 (corresponding to French Patent 1,265,829, to British Patent 865,727 and to U.S. Patent 2,926,154).

For the paper manufacture—which for simplicity's sake may be looked upon as a continuous filtration aiming at To facilitate the comparison of the paper resins A, B and C, the ratio of the filtering time of the blank test to the filtering time with the paper resin added has been calculated (see Table II), and this ratio, called "filtering time index," is designed "FTI" for short. The values indicated how many times faster a specimen containing paper resin passes through the filter.

Column III in Table 2 indicates the sum of the FTI's for each paper resin concentration tested. As the concentration of paper resin increases, the filtering speed, that is to say the efficacy of the paper resins, rises (9.00:12.80:15.03:17.12=100:142:167:190)

Column I of Table II lists the sums of the FTI's of the different paper resins for the individual pH values. The known paper resins A and C result only in a minor, but the paper resin B of this invention in a distinct, increase of the FTI's as the pH rises.

Column II of Table II lists the sums of the FTI's for the different paper resins. A comparison of these values (12.84:18.65:13.46) shows clearly that the paper resin B of the invention (18.65) produces the best results.

EXAMPLE 12

In this example the retentive capacity of a paper resin of this invention for fillers is compared with that of a known, commercial formaldehyde-free paper resin. The paper resin of this invention (=paper resin B) used in this comparison is a 10% aqueous solution, prepared as described in Example 1, of the reaction product of dicyandiamide with diethylenetriamine and epichlorohydrin.

As known formaldehyde-free paper resin (=paper resin C) there is used the 10% aqueous solution (marketed by Hercules Powder Co. under the registered trade mark "Kymene 557") of a condensation product of diethylenetriamine with adipic acid and epichlorohydrin, whose manufacture has been described in Example 1 of the published German Specification (DAS) 1,177,824 (corresponding to French Patent 1,265,829, to British Patent 865,727 and to U.S. Patent 2,926,154). The tests were conducted in the unsized paper mass, using as filler iron oxide pigment (registered trade mark "130 F Feinteig" of Messrs. Bayer).

The basic mass used for making paper was a pulp (fineness: 17° Schopper-Riegler; merely defibred), consisting of 50% of unbleached sulphite cellulose and 50% of unbleached sulphate cellulose. In this paper mass the following substances were incorporated in the indicated order of sequence: 28.5% (calculated from pulp) of iron oxide pigment "130 F Feinteig" of about 70% strength and the amounts shown in the following table of paper resin solutions B and C (expressed in percent dry resin referred to pulp). Sufficient water was added to produce a suspension of 1% referred to the total weight of solids. The pH value of the suspension was about 7 to 7.3. Papers were made weighing 110 g. per square meter. To measure the retentions, the papers were burnt and the ash, which consisted almost entirely of iron oxide pigment, was weighed. The retention equals the amount of ash expressed in percent of the iron oxide pigment originally used in the making of the paper.

The results are summarized in the following table:

| | Test 1 (blank; no filler) | Test 2 (blank; with filler) | Test 3 | Test 4 |
|---|---|---|---|---|
| Iron oxide "130 F Feinteig" (percent referred to pulp) | | 28.5 | 28.5 | 28.5 |
| Paper resin B (dry resin,) (percent referred to pulp) | | | 0.4 | |
| Paper resin C (dry resin), (percent referred to pulp) | | | | 0.4 |
| pH value | 7.0 | 7.0 | 7.0 | 7.2 |
| Ash percent referred to paper | | 2.45 | 8.75 | 7.0 |
| Retention (amount of ash expressed in percent of the amount of iron oxide pigment used in making the paper) | | 14.70 | 52.5 | 42.0 |

The above data demonstrate clearly the superiority of the paper resin B of the invention over the best commercially available formaldehyde-free paper resin C for improving the retentive capacity for fillers and pigments in paper making.

What is claimed is:

1. A new resinous nitrogen-containing condensation product which is obtained by condensing in a first stage (a) an amide selected from the group consisting of dicyandiamide and cyanamide with (b) a polyamine containing at least three amino groups selected from the group consisting of primary amino group and secondary amino group, and reacting the resulting polycondensate in a second reaction stage with (c) an epihalohydrin, both operations being performed at an elevated temperature.

2. A condensation product according to claim 1, being derived from a polyalkylene-polyamine, which contains in addition to at least two primary amino groups at least one secondary amino group, as the polyamine (b).

3. A condensation products according to claim 2, being derived from diethylenetriamine as the polyamine (b).

4. A condensation product according to claim 1, wherein in the first reaction stage for every equivalent of primary amino groups of the polyamine (b) 0.1 to 1.0 mol of dicyandiamide are used.

5. A condensation product according to claim 1, wherein in the first reaction stage for every equivalent of primary amino groups of the polyamine (b) 0.2 to 2.0 mols of cyanamide are used.

6. A condensation product according to claim 1 being derived from epichlorohydrin as the epihalohydrin (c).

7. A condensation product according to claim 1, wherein in the second reaction stage 0.3 to 3 mols of epihalohydrin (c) for every equivalent of secondary amino groups of the polyamine (b) employed in the first reaction stage are used.

8. A condensation product according to claim 1, wherein part of the amide (a) is replaced by a member selected from the group consisting of $C_1$ to $C_6$ saturated aliphatic dicarboxylic acid monoalkyl dicarboxylic acid ester and dialkyl $C_1$ to $C_6$ saturated aliphatic dicarboxylic acid ester.

9. A condensation product according to claim 8, wherein part of the amide (a) is replaced by a member selected from the group consisting of adipic acid, lower monoalkyl ester of adipic acid and lower dialkyl ester of adipic acid.

No references cited.

WILLIAM H. SHORT, *Primary Examiner.*

T. PERTILLA, *Assistant Examiner.*